United States Patent [19]
Gaunt

[11] Patent Number: 5,002,156
[45] Date of Patent: Mar. 26, 1991

[54] POSITIVE DISPLACEMENT PNEUMATIC LUBRICATOR

[75] Inventor: Frank L. Gaunt, Kent, Wash.

[73] Assignee: Illinois Tool Works, Inc., Glenview, Ill.

[21] Appl. No.: 418,666

[22] Filed: Oct. 10, 1989

[51] Int. Cl.$^5$ ............................................. F01M 1/08
[52] U.S. Cl. ................................... 184/39.1; 184/7.4; 184/6.26
[58] Field of Search .................. 184/7.4, 39, 39.1, 41, 184/42, 55.1, 55.2, 6.26

[56] References Cited

U.S. PATENT DOCUMENTS

| | | | |
|---|---|---|---|
| Re. 26,475 | 10/1970 | Borman et al. | 408/58 X |
| 2,344,671 | 3/1944 | Bertsch | 252/52 R X |
| 2,719,603 | 10/1955 | Le Clair | 184/29 X |
| 2,792,911 | 5/1957 | Harter | 184/7.4 |
| 3,130,818 | 4/1964 | Smith et al. | 184/29 |
| 3,140,664 | 7/1964 | Thomas | 184/29 X |
| 3,421,600 | 1/1969 | Gleason et al. | 184/7.4 |
| 3,487,892 | 1/1970 | Kiefer | 184/27 R |
| 3,547,350 | 12/1970 | Marcoux | 408/61 X |
| 3,595,342 | 7/1971 | O'Leary | 184/39.1 |
| 3,618,461 | 11/1971 | Parker | 184/109 X |
| 3,693,757 | 9/1972 | Callahan et al. | 184/29 X |
| 3,868,195 | 2/1975 | Anderson et al. | 184/6.26 X |
| 3,888,420 | 6/1975 | Boelkins | 184/7.4 |
| 3,899,433 | 8/1975 | Unick et al. | 252/52 R |
| 3,995,717 | 12/1976 | Kroffke | 184/7.4 |
| 4,125,176 | 11/1978 | Thrasher | 184/29 X |
| 4,147,232 | 4/1979 | Gaunt et al. | 184/102 X |
| 4,147,234 | 4/1979 | Lewkowicz et al. | 184/6.26 |
| 4,345,668 | 8/1982 | Gaunt | 184/29 |

OTHER PUBLICATIONS

"Pulsing Coolant Speeds Drilling", Industrial Lubrication, Jul. 1968, vol. 20-#7.
Master Pneumatic-Detroit, Inc. positive displacement, air pulse driven lubricant pump.
7-79 one page drawing of Master Pneumatic-Detroit, Inc.'s Adjustable Servo Meter Parts Drawing.

Primary Examiner—Ira S. Lazarus
Assistant Examiner—Alan B. Cariaso
Attorney, Agent, or Firm—Gregory W. Moravan

[57] ABSTRACT

A precision, highly reliable, positive displacement, pneumatic lubricant for pumping lubricant to a tool and work piece during machining operations; and for delivering compressed atomizing air thereto. The lubricator pumps lubricant substantially continuously at highly accurate, very low flow rates which can be minutely varied according to the needs of the user. The lubricator's piston delivers one pulse of lubricant for each input air pulse which is supplied to the lubricator from a source of input air pulses. The lubricator includes internal check valves for preventing back flow of lubricant into the lubricator's source, and for preventing back flow of pumped lubricant into the lubricator. The lubricator has an adjustable stop which controls the stroke of its piston, and which thus controls the amount of lubricant which is pumped by each pumping stroke of its piston. The lubricator also has positive stops for the maximum and minimum adjustment of its adjustable stop. The positive stops prevent endless turning of the lubricator's adjustable stop in either direction with no change being made in the amount of lubricant pumped by each pumping stroke of its piston. The lubricator's valve body is made stackable so that one lubricator may comprise several valve bodies; each valve body being able to independently deliver lubricant and atomizing air to its respective tool and work piece through coaxial atomizing air/lubricant output lines. If the lubricator has more than one valve body, their lubricant input means, air pulse input means, air relief means, and compressed air input means are in fluid communication with each other.

15 Claims, 4 Drawing Sheets

POSITIVE DISPLACEMENT PNEUMATIC LUBRICATOR

BACKGROUND OF THE INVENTION

The present invention relates to lubricating devices. More particularly, it relates to lubricating devices which are capable of dispensing very accurate quantities of special lubricants at very low flow rates for lubricating tools and work pieces during machining operations.

SUMMARY OF THE INVENTION

As is known, during machining operations large amounts of heat are generated by the friction between the tool and work piece. If not effectively dealt with, this heat is highly undesirable since it leads to the early dulling or failure of the tool; or it may render the tool inoperable in other ways, such as by welding to it chips of metal formed during the machining operations.

One conventional way of solving the problem of excessive heat buildup during machining operations is to apply special lubricants to the tool and work piece which are so effective at reducing the friction between the tool and work piece that the heat generated during machining operations is reduced to acceptable levels. Said special lubricants are applied at very low flow rates to the tool and work piece; and are essentially consumed during the machining operations.

Some examples of said special lubricants are Boelube brand lubricant and Accu-Lube brand lubricant; both of which are liquids at room temperature. Boelube comprises high carbon (long carbon chain) fatty alcohols and is manufactured by the Orelube Corporation located in Plain View, N.Y. Accu-Lube comprises fractions of fatty acids and fatty alcohols, and is sold by Lubricating Systems, Inc. of Kent, Wash.

Although the exact flow rates of said special lubricants will vary somewhat depending on the particular special lubricant being used, on the particular machining operation being conducted, on the hardness and metal from which the work piece is made, on the particular machine tool being used, etc., typically such flow rates will be in the range of from about 0.10 to about 10.0 cc's (cubic centimeters) per minute.

However, the use of such very low flow rates of said special lubricants does present several problems. For example, since said special lubricants are typically very expensive, it will be appreciated that if the flow rate of said special lubricants is higher than is required for effective machining operations, costly wastage will occur. On the other hand, if the flow rate is too low, loss of the tool, and possibly the work piece, may result. Accordingly, extremely precise metering of such very low flow rates is imperative.

In addition, since the exact flow rates of said special lubricants which are needed will vary according to the particular special lubricant being used, the particular machining operations being performed, the particular machine tool being used, the hardness and type of the metal from which the work piece is made, etc., it is essential that it be possible to achieve very small changes in the already very low basic flow rate of said special lubricants which is consistent with superior tool life and operation.

Further, it is necessary that the lubricating apparatus which delivers such very low flow rates of said special lubricants be highly reliable. This is because if it fails to continuously deliver the precise flow rate of said special lubricants which is required, loss of the tool, and possibly the work piece, will occur shortly after the flow of said special lubricants is too low or is interrupted.

Accordingly, one of the objects of the present invention is to provide a highly reliable, precision, very low flow rate lubricator for machining operations. Another object of the present invention is to provide such a lubricator which has the further capability of having its flow rates selectively adjustable in minute amounts for the optimum minimum delivery of said special lubricants to the tool and work piece.

In basic form, the lubricator of the present invention comprises a precision, positive displacement, pneumatic injection pump which delivers an output pulse of lubricant to a lubricant output tube in response to each input air pulse which is delivered to it. The lubricant output tube is adapted to convey the lubricant output pulses to the machine tool where they are then applied to the tool and work piece by any suitable conventional means.

The lubricator of the present invention may be provided with two internal check valves. One check valve achieves one of the objects of the present invention, which is to prevent back flow of lubricant from the lubricator into the lubricator's source of lubricant during the pumping stroke of the lubricator's piston. The other check valve achieves another of the objects of the present invention, which is to prevent back flow of lubricant from the lubricator's lubricant output tube into the lubricator during the return stroke of the lubricator's piston.

The lubricator of the present invention may also be provided an adjustable stop which controls the travel of the lubricator's piston, and which thus controls the amount of lubricant pumped by each pumping stroke of the piston. Preferably, the adjustable stop is provided with positive stops for its minimum and maximum adjustments, which achieves another of the objects of the present invention, namely, to prevent the user from endlessly turning the adjustable stop in either direction with no further actual adjustment in amount of lubricant pumped by the piston.

Since many machine tools incorporate a pneumatic chip blower and may use compressed air to apply said special lubricants to the tool and work piece, a further object of the present invention is to conveniently supply both said special lubricants and compressed air to the machine tools. To this end, the lubricator of the present invention may be internally arranged so that its lubricant output tube and its atomizing air output hose are coaxially arranged, with its lubricant output tube running inside of its atomizing air output hose.

In addition, the lubricator may include needle valve means for selectively varying the amount of atomizing air which it delivers to its atomizing air output hose. Naturally, if only lubricant is needed by a particular machine tool, the flow of compressed air from the lubricator can be cut off by using the lubricator's needle valve means or by cutting off the lubricator's source of compressed air. Similarly, if only compressed air is needed by a particular machine tool, the flow of lubricant from the lubricator can be cut off by using the adjustable stop for the lubricator's piston, by cutting off the lubricator's source of input air pulses, or by cutting off the lubricator's source of lubricant.

A further object of the present invention is to provide a lubricator which can simultaneously supply lubricant and compressed air to more than one machine tool; with the amount of lubricant and compressed air being supplied to each machine tool being independently controllable This object is achieved by providing the lubricator with stackable valve bodies; with each valve body being used to supply lubricant and atomizing air to its respective machine tool. The valve bodies are constructed so that the lubricator's input lubricant, input air pulses and input compressed air are shared by all of the valve bodies; whose air relief means are in fluid communication with each other.

It should be understood that the foregoing is intended to be a brief, not an exhaustive, summary of the objects, features, advantages and characteristics of the present invention, since these and further objects, features, advantages and characteristics of the present invention will be directly or inherently disclosed to those skilled in the art to which it pertains by the following, more detailed description of the present invention.

DESCRIPTION OF THE PREFERRED EMBODIMENTS

Construction of the Invention

Figure 1:
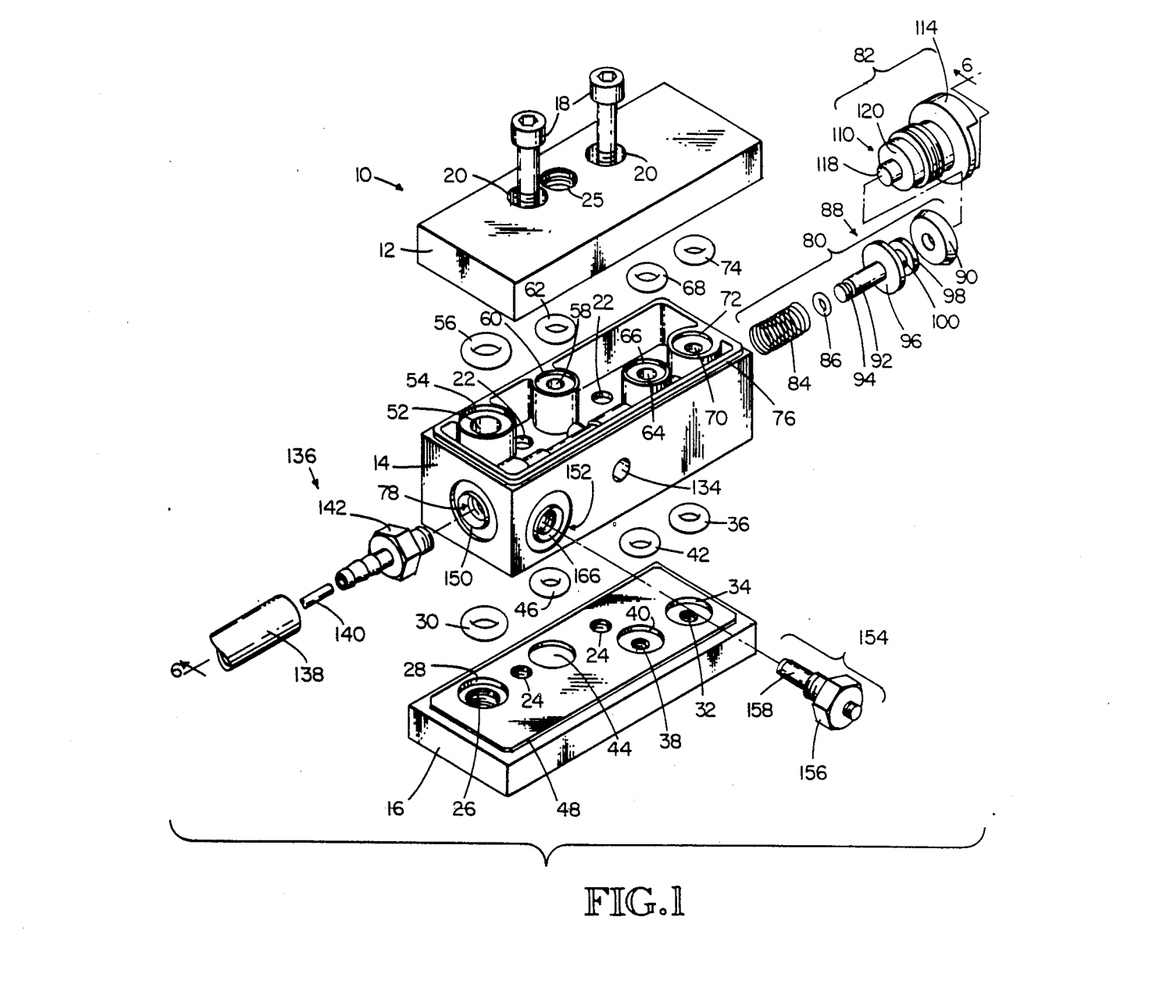
FIG. 1 is a partially exploded, perspective view of the present invention.

Turning now to FIG. 1, the lubricator of the present invention is shown generally designated at 10. In basic form, lubricator 10 comprises an upper plate 12, a valve body 14 and a lower plate 16 which are assembled together with a pair of assembly bolts 18. Bolts 18 pass through bolt holes 20, 22 in upper plate 12 and valve body 14, respectively, and are screwed into threaded bores 24 in lower plate 16. Upper and lower plates 12, 16 and valve body 14 can be made from any strong, crack resistant metal or plastic Due to its complexity, valve body 14 is preferably injection molded from plastic or die cast from metal in order to help minimize its cost.

Figure 2:
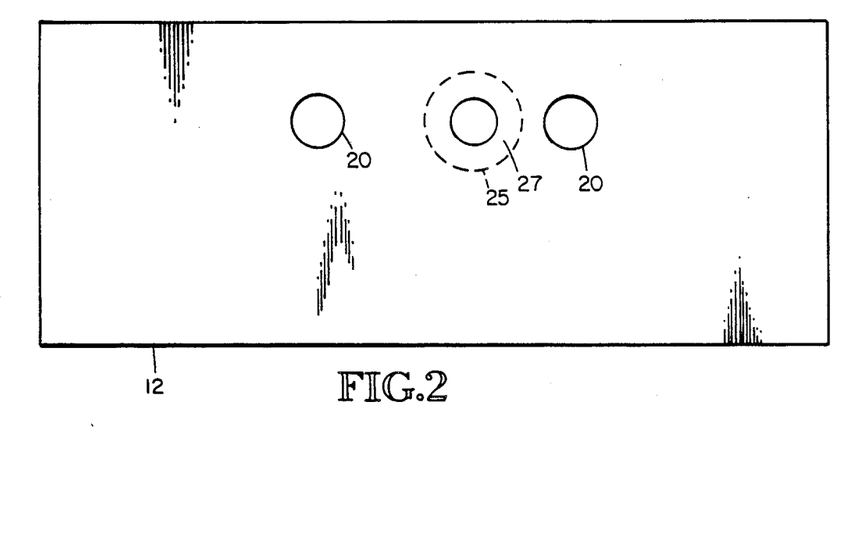
FIG. 2 is a bottom plan view of the invention's upper plate.

As seen in FIGS. 1 and 2, upper plate 12 includes a threaded lubricant input bore 25, which is adapted to be connected by any conventional means to a source of lubricant. Each of upper plate 12's bolt holes 20 is sized to receive the head of its respective bolt 18 within it; and includes an internal shoulder 27 (see FIG. 2), which acts as a stop for its respective bolt 18 when the bolt's head is flush with upper plate 12's top surface.

Figure 3:
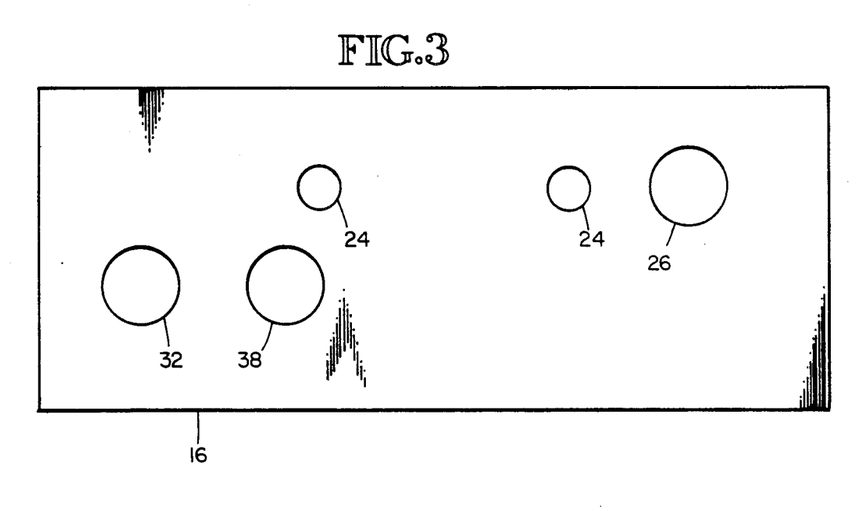
FIG. 3 is a bottom plan view of the invention's lower plate.

Referring now to FIGS. 1 and 3, it is seen that lower plate 16 has a threaded atomizing air input bore 26 with an O-ring recess 28 for O-ring 30; a threaded piston air pulse input bore 32 with an O-ring recess 34 for O-ring 36; a threaded piston air relief bore 38 with an O-ring recess 40 for O-ring 42; and a blind bore 44 which forms an O-ring recess for O-ring 46. Rubber O-rings 30, 36, 42 and 46 form seals between corresponding portions of the top of base plate 16 and the bottom of valve body 14.

Lower plate 16's threaded atomizing air input bore 26 is adapted to be connected by any conventional means to a compressed air source. The pressure of the compressed air delivered to lubricator 10 from the compressed air source will be selected by the particular user in accordance with his needs and the particular machine tool being used. However, typically, a machine tool's chip blower and lubricant atomizer or applicator use compressed air having pressure of about 80 pounds per square inch (psi).

Lower plate 16's threaded air pulse input bore 32 is adapted to connected to any conventional source of pulses of compressed air, such as an air logic device made by Crouzet Division Aerospatial, 62–64 Emile Zola Avenue, Paris, France 75115 under part number 81 532 001 for the air logic device's base, and part number 81 506 820 for the air logic device's main body. Said air logic device is designed to operate with an input air pressure of 42 to 120 psi and will, in response to its input air, deliver output pulses of compressed air with an air pulse frequency which is selectively adjustable from 0 to 180 air pulses per minute. Because said air logic device will generate its output air pulses with an input air pressure of 42 to 120 psi, the device is relatively immune to the changes in air pressure typically encountered in a manufacturing facility's installed compressed air system, thus enhancing the reliability of lubricator 10.

Lower plate 16's threaded piston air relief bore 38 can either communicate directly with the atmosphere, or, if desired, it can be connected to any conventional conduit means so that it communicates with the atmosphere at a location which is remote from lubricator 10.

The top of lower plate 16 has a peripheral locating shoulder 48 which mates with a corresponding peripheral locating recess 50 (see FIG. 5) in the bottom of valve body 14, for accurate registration of lower plate 16 and valve body 14 with respect to each other when lubricator 10 is assembled.

Figure 4:
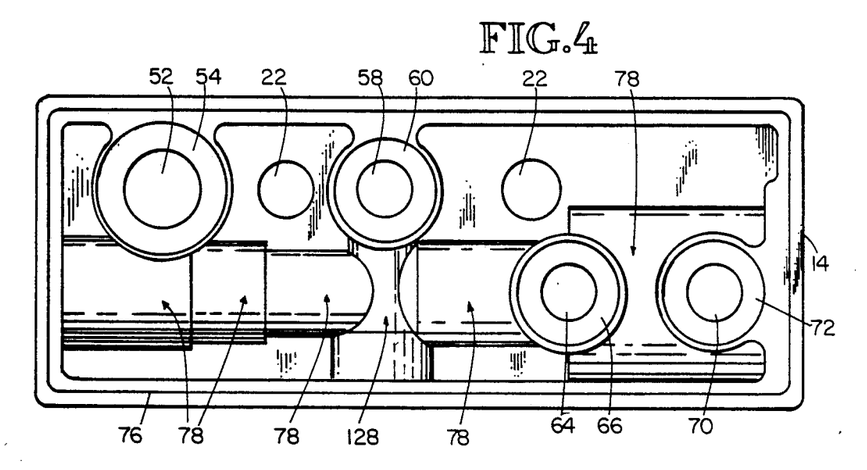
FIG. 4 is a top plan view of the invention's valve body.

Referring now to FIGS. 1 and 4, it is seen that valve body 14 includes a vertical atomizing air input bore 52 with an O-ring recess 54 for O-ring 56; a vertical lubricant input bore 58 with an O-ring recess 60 for O-ring 62; a vertical piston air relief bore 64 with an O-ring recess 66 for O-ring 68; and a vertical piston air pulse input bore 70 with an O-ring recess 72 for O-ring 74. Rubber O-rings 56, 62, 68, 74 form seals between corresponding portions of the top of valve body 14 and the flat, smooth bottom of upper plate 12. The top of valve body 14 includes a locating shoulder 76 whose purpose will be described below. When lubricator 10 is assembled, there is fluid communication between valve body 14's bore 58 and upper plate 12's bore 25. When lubricator 10 is assembled, upper plate 12's smooth, flat bottom surface acts as a plug for the upper ends of valve body 14's bores 52, 64, 70. Alternatively, an air relief bore could be provided in upper plate 12 which was in fluid communication with valve body 14's vertical piston air relief bore 64.

Figure 5:
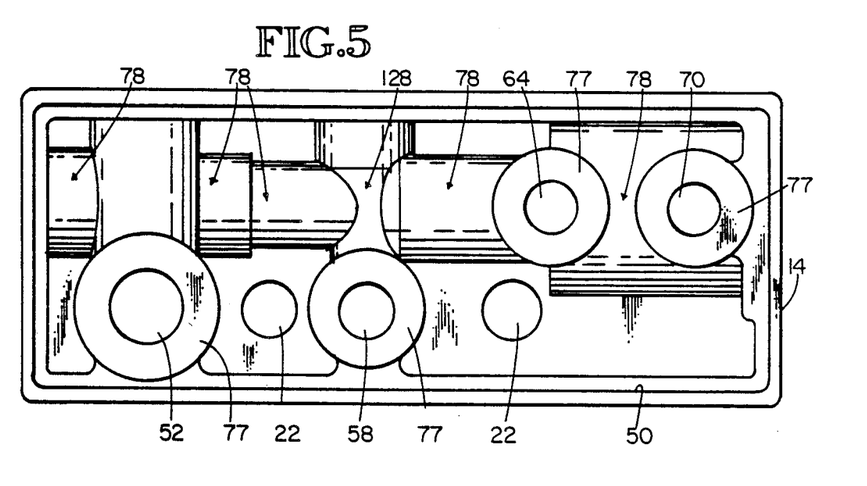
FIG. 5 is a bottom plan view of the invention's valve body.

Referring now to FIG. 5, it is seen that the bottoms of the valve body 14's atomizing air input bore 52, lubricant input bore 58, piston air relief bore 64 and piston air pulse input bore 70 are each provided with a flat 0-ring seal surface 77 for their respective 0-rings 30, 46, 42 and 36. When lubricator 10 is assembled, there is fluid communication between valve body 14's bores 52, 64, 70 and lower plate 16's bores 26, 38, 32, respectively; while lower plate 16's blind bore 44 acts to plug the lower end of valve body 14's bore 58.

Alternatively, when lubricator 10 has only one valve body 14, upper and lower plates 12, 16 could be eliminated. In such an event, one end of valve body 14's bores 52, 58, 64, 70 would be plugged by any suitable conventional means; and other end of valve body 14's bores 52, 58, 64, 70 would be connected by any suitable conventional means to a compressed air source, to a lubricant source, to the atmosphere, and to an input air pulse source, respectively.

Naturally, upper plate 12's lubricant input bore 25 and lower plate 16's blind bore 44 could be interchanged. Similarly, one or more of lower plate 16's bore's 26, 38, 32 could be located in upper plate 12; and for each bore which was so located in upper plate 12, lower plate 16 would be modified to act as a plug for valve body 14's corresponding bore 52, 64, 70, respectively.

As was mentioned above, in basic form, lubricator 10 comprises an upper plate 12, a valve body 14 and a lower plate 16, all of which are assembled together with a pair of bolts 18. However, it is within the scope of the present invention for two or more valve bodies 14 to be used, with the valve bodies 14 being stacked on top of each other between upper and lower plates 12, 16. For example, if two valve bodies 14 were used, then the peripheral locating shoulder 76 in the top of the lower valve body 14 would be fitted into the peripheral locating recess 50 in the bottom of the upper valve body 14 for accurate registration of the two valve bodies 14 with respect to each other. As many valve bodies 14 can be stacked on top of each other between upper and lower plates 12, 16 as is desired.

If two or more valve bodies 14 are used, each lower valve body 14 is provided with a set of 0-rings 56, 62, 68, 74 to provide a seal between its bores 52, 58, 64, 70 and the corresponding bores 52, 58, 64, 70 in the adjacent valve body 14 above it. In addition, assembly bolts 18 would be selected to have a length sufficient to hold top plate 12, valve bodies 14 and bottom plate 16 assembled together. If two or more valve bodies 14 are used, there is fluid communication between their respective bores 52, 58, 64, 70.

Figure 6:
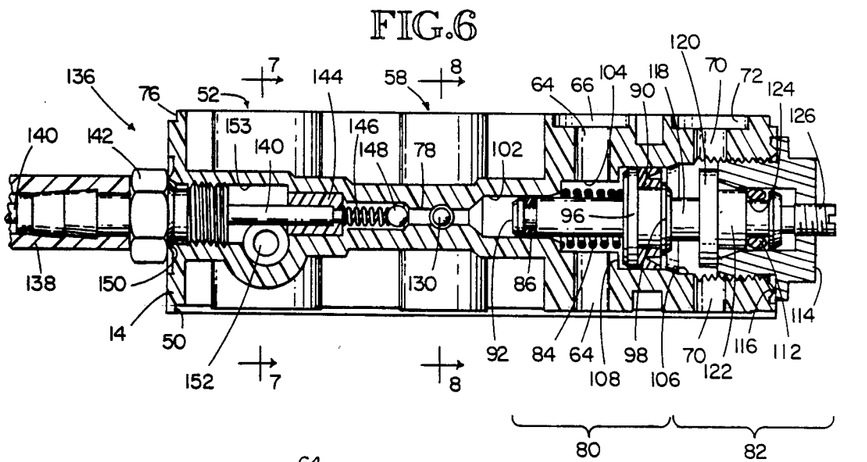
FIG. 6 is a partial cross-sectional view taken generally along line 6—6 of FIG. 1, with some parts shown in elevation.

Turning now to FIG. 6, it is seen that a horizontal, longitudinal main bore 78 extends the complete length of valve body 14. The right hand portion of main bore 78 defines a lubricant pumping chamber 102, a piston air relief chamber 104 and a piston air pulse input chamber 106. Air relief chamber 104 is in fluid communication with vertical piston air relief bore 64; and air pulse input chamber 106 is in fluid communication with vertical air pulse input bore 70.

As seen in FIGS. 1 and 6, the right hand portion of main bore 78 carries a piston assembly 80 and a stop assembly 82.

Piston assembly 80 comprises a piston return spring 84, a piston lubricant seal (a rubber 0-ring) 86, a brass piston 88 and a rubber piston air seal 90. As seen in FIGS. 1 and 6, piston 88 is a one-piece member comprising, from left to right, a piston shaft 92 having an annular recess 94 for lubricant seal 86; an annular shoulder 96; and a piston head 98 having an annular recess 100 for piston air seal 90. Piston lubricant seal 86 and piston air seal 90 are assembled to piston 88 by passing them over piston shaft 92 and piston head 98, respectively, until they are seated in their respective annular recesses 94, 100.

As seen in FIG. 6, piston return spring 84 is located in piston air relief chamber 104. Alternatively, piston return spring 84 could be suitably sized to fit inside, and could be located inside, lubricant pumping chamber 104.

Referring again to FIGS. 1 and 6, it is seen that stop assembly 82 comprises an adjustable brass stop 110, a stop seal (a rubber 0-ring) 112, and a brass stop nut 114. Stop 110 is a one-piece member comprising, from left to right, a stop shaft 118 which butts against piston 88's head 98; an annular shoulder 120; a neck 122 having an annular recess 124 for stop seal 112; and a threaded head 126 which screws into stop nut 114. Stop seal 112 is assembled to stop 110 by passing it over stop neck 122 until it is seated in its annular recess 124. Stop 110 and stop nut 114 are assembled together by screwing stop 110's threaded head 126 into stop nut 114.

In order to assemble valve body 14, piston assembly 80, and stop assembly 82 together, piston spring 84 is first inserted over piston 88's shaft 92 until it butts against piston shoulder 96. Then piston 88 (with its lubricant seal 86, air seal 90 and spring 84) is inserted into main bore 78 until it is positioned as seen in FIG. 6. Last, stop nut 114 (with its stop 110 and stop seal 112) is screwed all of the way into the right hand end of main bore 78 until it makes sealing contact with valve body 14's annular ridge seal 122, as is also seen in FIG. 6.

Figure 8:
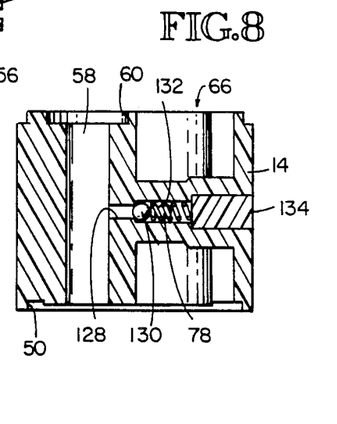
FIG. 8 is a cross-sectional view taken generally along line 8—8 of FIG. 6, with some parts shown in elevation.

Referring now to FIGS. 6 and 8, a horizontal, transverse lubricant input bore 128 provides fluid communication between vertical lubricant input bore 58 and main bore 78. Lubricant input bore 128 includes an enlarged portion in which is located a conventional lubricant input check valve comprising check ball 130 and check spring 132. After check ball 130 and check spring 132 are inserted into transverse lubricant input bore 128, they are held in place by plug 134 which is secured in lubricant input bore 128 by any conventional means, such as by gluing or by a tight, leak proof friction fit. Alternatively, a conventional check valve, which served the same purpose as said lubricant input check valve, could be located outside of lubricator 10 between the lubricant source and upper plate 12's lubricant input bore 25.

Referring now to FIGS. 1 and 6, it is seen that the left hand portion of main bore 78 carries an atomizing air/lubricant output assembly 136. Atomizing air/lubricant output assembly 136 comprises an atomizing air output hose 138, a lubricant output tube 140, a barb fitting 142, a lubricant output seal 144, and a conventional lubricant output check valve comprising a lubricant output check spring 146 and a lubricant output check ball 148. Alternatively, a conventional check valve, which served the same purpose as said lubricant output check valve, could be located outside of lubricator 10 in or at the end of its lubricant output tube 140.

In order to assemble valve body 14 and atomizing air/lubricant output assembly 136 together, lubricant output check ball 148 and lubricant output check spring 146 are first inserted into main bore 78 until they are located as seen in FIG. 6. Next, rubber or soft plastic lubricant output seal 144 is inserted into main bore 78 until it is located as seen in FIG. 6, where it is held in place by a snug, leak proof friction fit. Then lubricant output tube 140 is inserted into lubricant output seal 144, as seen, where it is held in place by a snug, leak proof friction fit. Next, barb fitting 142 is passed over lubricant output tube 140 and is then screwed into the left end of horizontal, transverse bore 78 until it makes sealing contact with valve body 14's ridge seal 150, as seen. Barb fitting 142's threads are straight rather than tapered, in order to help prevent valve body 14 from being split when barb fitting 142 is screwed into it. A seal between barb fitting 142 and valve body 14 is provided by valve body 14's ridge seal 150, rather than by any tapering of barb fitting 142's threads. Last, atomizing air output hose 138 is passed over lubricant output tube 140, and is then passed over and secured to barb fitting 142 as seen.

Figure 7:
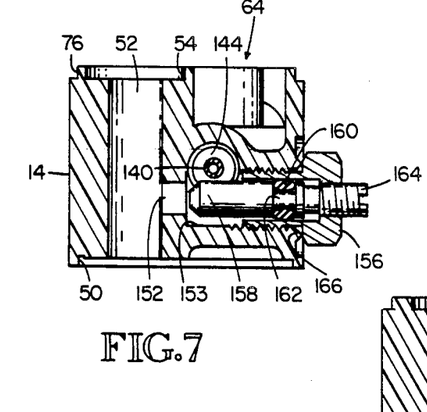
FIG. 7 is a partial cross-sectional view taken generally along line 7—7 of FIG. 6, with some parts shown in elevation.

As best seen in FIGS. 6 and 7, the left hand portion of main bore 78 defines an atomizing air chamber 153; and as best seen in FIGS. 1, 6 and 7, valve body 14 defines a transverse, horizontal atomizing air bore 152 which is in fluid communication with vertical atomizing air input bore 52 and atomizing air chamber 153. The internal diameter of the bore in barb fitting 142 is sized considerably larger than the outside diameter of lubricant output tube 140; in order to permit the free flow of atomizing air from atomizing air chamber 153 to atomizing air output hose 138 through barb fitting 142.

Referring now to FIGS. 1 and 7, atomizing air chamber 153 carries an atomizing air needle valve assembly 154 which comprises a brass needle valve nut 156, a brass needle 158 and a needle valve seal (a rubber O-ring) 160. Needle valve assembly 154 is generally of conventional construction.

Needle 158 has an annular recess 162 for needle valve seal 160, and has a threaded head 164. Needle valve seal 160 is assembled to needle 158 by passing it over needle 158 until it is seated in its needle valve recess 162. Needle 158 is assembled to needle nut 156 by screwing its head 164 into needle nut 156. Valve body 14 and needle valve assembly 154 are then assembled together by screwing needle nut 156 (with its needle 158 and needle valve seal 160) into atomizing air chamber 152 until it makes sealing contact with valve body 14's ridge seal 166, as seen.

OPERATION OF THE INVENTION

Before lubricator 10 is ready for operation, certain connections need to be made.

A source of lubricant is connected to top plate 12's threaded lubricant input bore 25. Since lubricant input bore 25 is in fluid communication with the vertical lubricant input bore 58 of each valve body 14, input lubricant is thereby provided to each valve body 14.

A source of compressed air pulses is connected to bottom plate 16's threaded air pulse input bore 32. Since air pulse input bore 32 is in fluid communication with the vertical air pulse input bore 70 in each valve body 14, compressed air pulses are thereby provided to each valve body 14.

Bottom plate 16's threaded piston air relief bore 38 may be permitted to vent directly to the atmosphere; or if remote venting is desired, an air relief line may be connected to bottom plate 16's threaded piston air relief bore 38. Since piston air relief bore 38 is in fluid communication with each vertical piston air relief bore 64 in each valve body 14, piston air relief is thereby provided for each valve body 14.

A source of pressurized atomizing air is connected to bottom plate 16's threaded atomizing air input bore 26.

Since atomizing air input bore 26 is in fluid communication with the vertical atomizing air input bore 52 in each valve body 14, atomizing air is thereby provided for each valve body 14.

Once the above connections have been made, lubricator 10 is then primed by allowing it to run for a short time until air bubble free lubricant flows out of the free end of lubricant output tube 140. Once lubricator 10 has been primed, its operation is as follows.

Referring now to FIG. 6, upon the delivery of a compressed air pulse to valve body 14's air pulse input chamber 106 from the source of pressurized air pulses via air pulse input bore 70, the compressed air pulse acts on piston air seal 90 and piston head 98. This forces piston 88 to move to the left and compress piston return spring 84. As piston 88 moves to the left, it forces lubricant out of lubricant pumping chamber 102, thereby forcing check ball 148 to open and permit lubricant to be forced through lubricant output tube 140. While this is happening, back flow of lubricant from the central portion of main bore 78 into vertical lubricant input bore 58 through horizontal transverse lubricant input bore 128 is prevented by check ball 130 and check spring 132, as best seen in FIG. 8. As piston 88 is being forced to the left by the input air pulse, the air in air relief chamber 104 which is compressed by piston 88 exits chamber 104 through vertical piston air relief bore 64, to vent, directly or indirectly, to the atmosphere.

When the input air pulse is over, piston return spring 84 forces piston 88 to move to the right to its starting position. As piston 88 starts to move to the right, check spring 146 forces check ball 148 closed, thereby preventing any back flow of lubricant from lubricant output tube 140 into main bore 78 of valve body 14. As piston 88 is moving to the right, a negative pressure is formed in lubricant pumping chamber 102 which immediately sucks check ball 130 open, thereby permitting lubricant from vertical lubricant input bore 58 to be sucked into lubricant pumping chamber 102 through transverse lubricant input bore 128. As piston 88 is moving to the right, a negative air pressure is formed in air relief chamber 104, thereby sucking air into chamber 104 from vertical piston air relief bore 64. As piston 88 is moving to the right, it also compresses the air in air pulse input chamber 106 and forces it out of chamber 106 through vertical air pulse input bore 70. The source of compressed air pulses which is connected to vertical air pulse input bore 70 is preferably constructed so that, between delivering air pulses to input bore 70, it vents to the atmosphere the air which is forced out of chamber 106 by piston 88.

The amount of lubricant which is pumped by each pumping stroke of piston 88 is governed by how far piston 88 travels in response to each input air pulse. In turn, the amount of travel of piston 88 is governed by the adjustment of stop 110.

Referring now to FIG. 6, as stop 110's threaded head 126 is screwed clockwise, the left end of stop 110's shaft 118, which butts against piston 88's head 98, forces piston 88 to the left. As stop 110's threaded head 126 is screwed clockwise further and further, the left end of piston 88's shoulder 96 will eventually be forced into contact with piston stop shoulder 108 of main bore 78. This results in zero travel of piston 88 and no lubricant being pumped by piston 88. Thus, piston stop shoulder 108 and piston 88 act, in effect, as a fixed positive stop for the clockwise adjustment of stop 110; while piston stop shoulder 108 acts as a fixed positive stop for the lower pumping limit for each pumping stroke of piston 88, which is zero.

If stop 110's threaded head 126 is then screwed counterclockwise, the travel of piston 88 is thereby permitted to increase in direct proportion to how far threaded head 126 is screwed counterclockwise. Thus, the amount of lubricant pumped by each pumping stroke of piston 88 is also thereby permitted to increase in direct proportion to how far threaded head 126 is screwed counterclockwise. As stop 110's threaded head 126 is screwed counterclockwise more and more, further movement of stop 110 will eventually be prevented when its shoulder 120 contacts the left end of stop nut 114. Thus, stop nut 114 acts as a fixed positive stop for the counterclockwise adjustment of stop 110; meaning that it acts as a fixed positive stop for the upper pumping limit of each pumping stroke of piston 88.

Thus, it is seen that the adjustment by stop 110 of both the upper and lower pumping limits for each pumping stroke of piston 88 is subject to positive stops. This is desirable since it prevents the possibility that stop 110 could be turned endlessly in either direction without any actual adjustment of the amount of lubricant being pumped by lubricator 10.

As was discussed above, the exact flow rates of said special lubricants which the user will require lubricator 10 to deliver to the tool and work piece will vary according to the particular special lubricant being used, the particular machining operation being performed, the particular machine tool being used, the hardness and type of the metal from which the work piece is made, etc. However, lubricator 10 will typically be required to provide substantially continuous flow rates of said special lubricants in the range of from about 0.10 to about 10.0 cc's per minute. Although, as mentioned above, the source of compressed air pulses can provide 0 to 180 compressed air pulses per minute; it is preferred that it be adjusted to deliver from about 20 to about 60 compressed air pulses per minute, so that lubricator 10 will deliver lubricant substantially continuously to its lubricant output tube 140.

When the typical flow rates of lubricant and preferred number of air pulses per minute which were mentioned above are used, the amount of lubricant which lubricator 10 will deliver to its lubricant output tube 140 for each pumping stroke of its piston 88, will range from about 0.0017 cc's to about 0.5 cc's per minute. It is preferred that pumping chamber 102, piston assembly 80 and stop assembly 82 be sized and arranged so that the amount of lubricant pumped by each pumping stroke of piston 88 can be varied by as little as about 0.0001 cc, or less. It is also preferred that lubricator 10 provide lubricant to lubricant output tube 140 at pressures of up to about 10,000 psi. This is done by suitably selecting the pressure of the input compressed air pulses, and by suitably selecting the size of lubricator 10's pumping chamber 102 and piston assembly 80. The valve body 14 illustrated in the figures is about four inches long, about 1 and ½ inches wide and about 1 and ¼ inches thick; with its various components being sized accordingly.

Turning now to FIGS. 6 and 8, the rate of flow of atomizing air from vertical atomizing air input bore 52 through horizontal atomizing air bore 152 to atomizing air chamber 153 and atomizing air output hose 138 is governed by needle valve assembly 154. If threaded needle valve head 164 is screwed clockwise as far as it will go, then the left end of needle 158 will plug horizontal atomizing air bore 152, thereby cutting off the flow of atomizing air to atomizing air chamber 153 and atomizing air output hose 138. If threaded needle valve head 164 is then screwed counterclockwise, the rate of flow of atomizing air through horizontal atomizing air bore 152 to atomizing air chamber 153 and atomizing air output hose 138 is thereby permitted to increase in direct proportion to how far threaded needle valve head 164 is screwed counterclockwise. Although the pressure and rate of flow of the atomizing air delivered by lubricator 10 to atomizing air output hose 138 will depend upon the needs of the user, typically the atomizing air will be delivered by lubricator 10 at pressures of about 80 psi and at flow rates of up to about 3 to 4 cubic feet per minute (cfm). Since the pressure of the atomizing air which is delivered by lubricator 10 is essentially the same as the pressure of the input compressed air which is provided to lubricator 10, it is apparent that by suitably selecting the pressure of the input compressed air to lubricator 10 the user can control the pressure of the atomizing air which is delivered by lubricator 10. If a greater flow rate of atomizing air is needed, then the size of all of the components through which the atomizing air passes in lubricator 10 can be increased accordingly.

In view of the foregoing, these and further modifications, adaptations and variations of the present invention will now be apparent to those skilled in the art to which it pertains, within the scope of the following claims. It is understood that the foregoing forms of the invention were described and/or illustrated strictly by way of non-limiting example.

What is claimed is:

1. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump a quantity of said lubricant out of said lubricant pumping chamber; an output means for receiving said quantity of lubricant which is pumped out of said lubricant pumping chamber by said piston means; and a piston return means for returning said piston means to its said starting position between successive said input air pulses; wherein said a first check valve means for preventing back flow of said lubricant from said lubricant pumping chamber into said lubricant input means while said piston means pumps at least some of said lubricant out of said lubricant pumping chamber; wherein said first check valve means is also for permitting said lubricant to flow from said lubricant input means into said lubricant pumping chamber while said piston means returns to its said starting position; and a second check valve means for preventing back flow of said lubricant from said output means into said lubricant pumping chamber while said piston means is returning to its said starting position; wherein said second check valve means is also for permitting said lubricant to flow from said lubricant pumping chamber into said output means while said piston means pumps at least some of said lubricant out of said lubricant pumping chamber.

2. A precision, positive displacement, very low flow rate, pneumatic lubricator for a tool and work piece; wherein said lubricator is adapted to be connected to an air pulse source which generates a stream of successive input air pulses, wherein said lubricator is also adapted to be connected to a lubricator source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump a quantity of said lubricant out of said lubricant pumping chamber; an output means for receiving said quantity of lubricant which is pumped out of said lubricant pumping chamber by said piston means; and a piston return means for returning said piston means to its said starting position between successive said input air pulses; wherein, during use, said piston means has an amount of travel which it travels in response to said input air pulses; wherein said valve body further comprises adjustable stop means for selectively adjusting said amount of travel of said piston means; and wherein said amount of travel of said piston means governs said quantity of lubricant which is pumped by said piston means in response to each said input air pulse.

3. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump a quantity of said lubricant out of said lubricant pumping chamber; an output means for receiving said quantity of lubricant which is pumped out of said lubricant pumping chamber by said piston means; and a piston return means for returning said piston means to its said starting position between successive said input air pulses; wherein, during use, said piston means has an amount of travel which it travels in response to said input air pulses; wherein said lubricator further comprises adjustable stop means for selectively adjusting said amount of travel of said piston means; wherein said lubricator further comprises mounting means for mounting said adjustable stop means to said valve body; wherein said amount of travel of said piston means governs said quantity of lubricant which is pumped by said piston means in response to each said input air pulse; wherein said piston means has predetermined minimum and maximum amounts of travel; and wherein said lubricator further comprises minimum and maximum positive stop means for preventing further adjustment of said adjustable stop means when said piston means reaches its said predetermined minimum and maximum amounts of travel, respectively.

4. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump a quantity of said lubricant out of said lubricant pumping chamber; an output means for receiving said quantity of lubricant which is pumped out of said lubricant pumping chamber by said piston means; and a piston return means for returning said piston means to its said starting position between successive said input air pulses; wherein said lubricator is further adapted to be connected to a compressed air source which supplies compressed air; wherein said compressed air source is separate from said air pulse source; wherein said compressed air source is adapted to furnish an at least substantially constant supply of compressed air; wherein said valve body further comprises a compressed air input means for receiving said compressed air and for delivering it to said output means of said valve body; and wherein said output means of said valve body is also for receiving said compressed air from said compressed air input means.

5. The lubricator according to claim 4, wherein said compressed air input means further comprises needle valve means for selectively controlling the amount of said compressed air which flow from said compressed air input means to said output means.

6. The lubricator according to claim 4, wherein said output means comprises a lubricant output line which receives said lubricant which is pumped out of said lubricant pumping chamber; wherein said output means further comprises a compressed air output line which receives said compressed air from said needle valve means; and wherein said output lines are arranged coaxially with respect to each other.

7. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump a quantity of said lubricant out of said lubricant pumping chamber; an output means for receiving said quantity of lubricant which is pumped out of said lubricant pumping chamber by said piston means; and a piston return means for returning said piston means to its said starting position between successive said input air pulses; wherein said lubricator further comprises a top plate, a bottom plate and an assembly means; wherein said assembly means are for holding said top plate, said valve body and said bottom plate in a predetermined relationship with respect to each other, with said valve body sandwiched between said top and bottom plates;

wherein one of said top and bottom plates defines an air pulse bore which receives said input air pulses from said air pulse source and delivers them to said air pulse input means of said valve body; wherein the other of said top and bottom plates comprises a plug for an adjacent end of said air pulse input means of said valve body;

wherein one of said top and bottom plates defines a lubricant bore which receives said lubricant from said lubricant source and delivers it to said lubricant input means of said valve body; and wherein the other of said top and bottom plates comprises a plug for an adjacent end of said lubricant input means of said valve body.

8. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump at least some of said lubricant out of said lubricant pumping chamber; an output means for receiving said lubricant which is pumped out of said lubricant pumping chamber by said piston means; and a piston return means for returning said piston means to its said starting position between successive said input air pulses;

wherein said lubricator further comprises a top plate, bottom plate and an assembly means; wherein said assembly means are for holding said top plate, said valve body and said bottom plate in a predetermined relationship with respect to each other, with said valve body sandwiched between said top and bottom plates;

wherein one of said top and bottom plates defines an air pulse bore which receives said input air pulses from said air pulse source and delivers them to said air pulse input means of said valve body; wherein the other of said top and bottom plates comprises a plug for an adjacent end of said air pulse input means of said valve body;

wherein one of said top and bottom plates defines a lubricant bore which receives said lubricant from said lubricant source and delivers it to said lubricant input means of said valve body; wherein the other of said top and bottom plates comprises a plug for an adjacent end of said lubricant input means o said valve body;

wherein said lubricator is further adapted to be connected to a compressed air source which supplies compressed air; wherein said valve body further comprises a compressed air input means for receiving said compressed air and for delivering it to said output means of said valve body; wherein said output means of said valve body is also for receiving said compressed air from said compressed air input means; wherein one of said top and bottom plates defines a compressed air bore which receives said compressed air form said compressed air source and delivers it to said compressed air input means of said valve body; and wherein the other of said top and bottom plates comprises a plug for an adjacent end of said compressed air input means of said valve body.

9. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises:

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during use, said input air pulse forces said piston means to move from a starting position towards said lubricant pumping chamber to pump at least some of said lubricant out of said lubricant pumping chamber; an output means for receiving said lubricant which is pumped out of said lubricant pumping chamber by said piston means; and a piston return means for returning said piston means to its said starting position between successive said input air pulses;

wherein said lubricator further comprises a top plate, a bottom plate and an assembly means; wherein said assembly means are for holding said top plate, said valve body and said bottom plate in a predetermined relationship with respect to each other, with said valve body sandwiched between said top and bottom plates;

wherein one of said top and bottom plates defines an air pulse bore which receives said input air pulses from said air pulse source and delivers them to said air pulse input means of said valve body; wherein the other of said top and bottom plates comprises a plug for an adjacent end of said air pulse input means of said valve body;

wherein one of said top and bottom plates defines a lubricant bore which receives said lubricant from said lubricant source and delivers it to said lubricant input means of said valve body; wherein the other of said top and bottom plates comprises a plug for an adjacent end of said lubricant input means of said valve body;

wherein said piston return means comprises a spring located in a spring portion of said piston chamber; wherein said valve body further comprises air relief means for providing air relief for said spring portion of said piston chamber; and wherein at least one of said top and bottom plates defines an air relief bore which is in fluid communication with said air relief means of said valve body.

10. A precision, positive displacement, very low flow rate, pneumatic lubricator for a tool and work piece; wherein said lubricator is adapted to be connected to an air pulse source which generates a stream of successive input air pulses; wherein said lubricator is also adapted to be connected to a lubricant source which supplies lubricant; wherein said lubricator comprises a valve body; wherein said valve body defines a main bore comprising an air pulse chamber, a piston chamber and a lubricant pumping chamber; wherein said valve body comprises;

an air pulse input means for receiving said input air pulses and for delivering said input air pulses to said air pulse chamber of said valve body; a lubricant input means for receiving said lubricant and for delivering said lubricant to said lubricant pumping chamber of said valve body; a piston means for pumping said lubricant; wherein said piston means is located in said piston chamber at least substantially between said air pulse chamber and said lubricant pumping chamber; wherein, when an input air pulse is received by said air pulse chamber during sue, said input air pulse forces said piston means to move from a starting position towards said lubricant pumping chamber to pump at least some of said lubricant out of said lubricant pumping chamber; an output means for receiving said lubricant which is pumped out of said lubricant pumping chamber by said piston means; and a piston returns means for returning said piston means to its said starting position between successive said input air pulses;

wherein said lubricator further comprises a top plate, a bottom plate and an assembly means; wherein there are at least two of said valve bodies; wherein said assembly means are for holding said top late, said valve bodies and said bottom plate in a predetermined relationship with respect to each other, with said valve bodies sandwiched on top of each other between said top and bottom plates; wherein all of said air pulse input means of said valve bodies are in fluid communication with each other; wherein all of said lubricant input means of said valve bodies are in fluid communication with each other; wherein said top plate and said bottom plate each have a respective adjacent one of said valve bodies;

wherein one of said top and bottom plates defines an air pulse bore which receives said input air pulses from said air pulse source and delivers them to said air pulse input means of its said respective adjacent one of said valve bodies; wherein the other of said top and bottom plates comprises a plug for an adjacent end of said air pulse input means of its said respective adjacent one of said valve bodies;

wherein one of said top and bottom plates defines a lubricant bore which receives lubricant form said lubricant source and delivers it to said lubricant input means of its said respective adjacent one of said valve bodies; and wherein the other of said top and bottom plates comprises a plug for an adjacent end of said lubricant input means of tis said respective adjacent one of said valve bodies.

11. The lubricator according to claim 10, wherein said lubricator is further adapted to be connected to a compressed air source which supplies compressed air; wherein each said valve body further comprises a compressed air input means for receiving said compressed air and for delivering said compressed air to its said output means; wherein said output means of said valve bodies are also for receiving said compressed air from said compressed air input means of said valve bodies; wherein all of said compressed air input means of said valve bodies are in fluid communication with each other; wherein one of said top and bottom plates further defines a compressed air bore which receives said compressed air from said compressed air source and delivers it to said compressed air input means of its said respective adjacent one of said valve bodies; and wherein the other of said top and bottom plates comprises a plug for an adjacent end of said compressed air input means of its said respective adjacent one of said valve bodies.

12. The lubricator according to claim 10, wherein each said piston return means of said valve bodies comprises a spring located in a spring portion of its said piston chamber; wherein each said valve body further comprises air relief means for providing air relief for said spring portion of its said piston chamber; wherein all of said air relief means of said valve bodies are in fluid communication with each other; and wherein at least one of said top and bottom plates defines an air relief bore which is in fluid communication with said air relief means of its said respective adjacent one of said valve bodies.

13. The lubricator according to claim 3, wherein said piston chamber comprises a piston stop shoulder means for preventing further travel of said piston means when said piston has reached its said predetermined minimum amount of travel; wherein said minimum positive stop means for preventing further adjustment of said adjustable stop means when said piston means reaches its said predetermined minimum amount of travel comprises said piston means; and wherein said maximum positive stop means for preventing further adjustment of said adjustable stop means when said piston means reaches its said predetermined maximum amount of travel comprises said mounting means for mounting said adjustable stop means to said valve body.

14. The lubricator according to claim 3, wherein said piston chamber comprises a piston stop shoulder means for preventing further travel of said piston means when said piston has reached its said predetermined minimum amount of travel; and wherein said minimum positive stop means for preventing further adjustment of said adjustable stop means when said piston means reaches its said predetermined minimum amount of travel comprises said piston means.

15. The lubricator according to claim 3, wherein said maximum positive stop means for preventing further adjustment of said adjustable stop means when said piston means reaches its said predetermined maximum amount of travel comprises said mounting means for mounting said adjustable stop means to said valve body.

* * * * *